United States Patent
Hatada

(10) Patent No.: US 10,116,768 B2
(45) Date of Patent: Oct. 30, 2018

(54) CONTROL SYSTEM, CONTROL METHOD, AND COMMUNICATION DEVICE

(71) Applicant: FUJITSU LIMITED, Kawasaki-shi, Kanagawa (JP)

(72) Inventor: Koki Hatada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 249 days.

(21) Appl. No.: 14/948,926

(22) Filed: Nov. 23, 2015

(65) Prior Publication Data
US 2016/0191669 A1    Jun. 30, 2016

(30) Foreign Application Priority Data
Dec. 26, 2014    (JP) .................................. 2014-265899

(51) Int. Cl.
G06F 15/177    (2006.01)
H04L 29/08    (2006.01)
H04L 12/24    (2006.01)

(52) U.S. Cl.
CPC .......... *H04L 67/34* (2013.01); *H04L 41/0813* (2013.01); *H04L 41/0853* (2013.01); *H04L 41/0873* (2013.01); *H04L 67/1095* (2013.01)

(58) Field of Classification Search
CPC .. H04L 67/34; H04L 67/1095; H04L 41/0813
(Continued)

(56) References Cited

U.S. PATENT DOCUMENTS 8,755,848 B2 * 6/2014 Jain ...................... H04W 88/06
340/539.3
2005/0229180 A1 * 10/2005 Ricciardi ............... G06F 9/465
718/100
(Continued)

FOREIGN PATENT DOCUMENTS

JP    7-66956    3/1995
JP    2007-122137    5/2007
(Continued)

OTHER PUBLICATIONS

Zhang et al., "See Me, See You: A Lightweight Method for Discriminating User Touches on Tabletop Displays", CHI '12. ACM, May 5-10, 2012, pp. 2327-2336.
(Continued)

*Primary Examiner* — Philip B Tran
(74) *Attorney, Agent, or Firm* — Staas & Halsey LLP

(57) ABSTRACT

A control system comprising: a server and a plurality of communication devices, wherein the server stores first mode information for each user, the first mode information being associated with a mode of an application and selected from among a plurality pieces of mode information of the mode, and transmits the first mode information of a first user to the plurality of communication devices operated by the first user, and the plurality of communication devices receive the first mode information, obtain second mode information set to the mode of the application installed to the communication device, record an operation content related to mode information change performed on the communication device, and determine whether the second mode information set to the mode of the application is switched to the first mode information, based on the operation content, the first mode information, and the second mode information.

13 Claims, 15 Drawing Sheets

(58) Field of Classification Search
USPC .................................................. 709/220, 224
See application file for complete search history.

(56) References Cited

U.S. PATENT DOCUMENTS

| | | | |
|---|---|---|---|
| 2006/0215576 A1* | 9/2006 | Yu | H04W 48/18 370/252 |
| 2008/0242370 A1* | 10/2008 | Lando | H04L 51/04 455/574 |
| 2009/0083469 A1* | 3/2009 | Tanaka | G06Q 10/10 710/305 |
| 2013/0117392 A1* | 5/2013 | Aceves | H04L 51/30 709/206 |
| 2014/0229728 A1* | 8/2014 | Zhang | G06F 3/14 713/100 |
| 2014/0247764 A1* | 9/2014 | Kukosa | H04W 52/0274 370/311 |
| 2015/0070247 A1 | 3/2015 | Kasahara | |
| 2015/0205106 A1* | 7/2015 | Norden | G02B 27/01 345/7 |

FOREIGN PATENT DOCUMENTS

| | | |
|---|---|---|
| JP | 2007-140590 | 6/2007 |
| JP | 2013-200775 | 10/2013 |

OTHER PUBLICATIONS

Meyer et al., "IdWristbands: IR-based User Identification on Multi-touch Surfaces", ITS '10. ACM, Nov. 7-10, 2010, pp. 277-278.
Adachi et al., "Forearm Menu: Using Forearm as Menu Widget on Tabletop System", ITS '13. ACM, Oct. 6-9, 2013, pp. 333-336.
Chen et al., "Duet: Exploring Joint Interactions on a Smart Phone and a Smart Watch", CHI 2014, One of a CHInd, ACM, 2014, pp. 159-168.
Japanese Office Action dated Aug. 28, 2018 in Japanese Patent Application No. 2014-265899.

* cited by examiner

FIG. 5A

| USER INFORMATION | COMMUNICATION DEVICE TYPE | ATTRIBUTE | MODE INFORMATION |
|---|---|---|---|
| user A | * | PUBLIC/PRIVATE | PUBLIC |
| user A | * | DRAWING (COLOR) | PEN (RED, THICKNESS 2) |
| user B | * | PUBLIC/PRIVATE | PRIVATE |
| user B | * | DRAWING (THICKNESS) | ERASER |
| user B | client 1 | PUBLIC/PRIVATE | PUBLIC |
| ... | ... | ... | ... |

FIG. 5B

| USER INFORMATION | COMMUNICATION DEVICE TYPE |
|---|---|
| user A | client 1 |
| user A | client 3 |
| user B | client 2 |

FIG. 6

| RECODE TIME | MODE INFORMATION |
|---|---|
| 10:08 | PUBLIC MODE<br>DRAWING MODE<br>COLOR PEN MODE (RED, THICKNESS 2) |
| 10:00 | PRIVATE MODE<br>DRAWING MODE |
| ... | ... |

FIG. 7

| CURRENT MODE OF COMMUNICATION DEVICE | USER MODE | AUTOMATIC SYNCHRONIZATION | MANUAL SYNCHRONIZATION |
|---|---|---|---|
| CERTAIN DRAWING MODE | CERTAIN DRAWING MODE | ○ | × |
| SPECIFIC COLOR PEN MODE | CERTAIN DRAWING MODE | × | ○ |
| PUBLIC MODE | PRIVATE MODE | × | ○ |
| DELETION MODE | SELECTION MODE | ○ | × |
| ... | ... | ... | ... |

FIG. 8

| USER INFORMATION | COMMUNICATION DEVICE TYPE | ATTRIBUTE | MODE INFORMATION | SYNCHRONIZATION | CREATED TIME |
|---|---|---|---|---|---|
| user A | * | PUBLIC/PRIVATE | PUBLIC | ○ | 10:10 |
| user A | * | PUBLIC/PRIVATE | PRIVATE | ○ | 10:00 |
| user A | * | DRAWING | PEN (RED, THICKNESS 2) | × | 10:08 |
| user A | * | DRAWING | PEN (BLUE, THICKNESS 2) | × | 10:00 |
| user B | * | PUBLIC/PRIVATE | PRIVATE | ○ | 10:00 |
| user B | * | DRAWING | ERASER | ○ | 10:00 |
| user B | client 1 | PUBLIC/PRIVATE | PUBLIC | ○ | 10:05 |
| ... | ... | ... | ... | ... | ... |

CONTROL SYSTEM, CONTROL METHOD, AND COMMUNICATION DEVICE

CROSS-REFERENCE TO RELATED APPLICATION

This application is based upon and claims the benefit of priority of the prior Japanese Patent Application No. 2014-265899, filed on Dec. 26, 2014, the entire contents of which are incorporated herein by reference.

FIELD

The embodiments discussed herein are related to a technology by which various modes set to communication devices are controlled.

BACKGROUND

An individual mode may be set to an application operated in each communication device. Therefore, when a user uses a plurality of communication devices, it is required that the user pays attention to the current mode in each of the communication devices. For example, in the case in which the user uses the plurality of communication devices, when the user changes a communication device that is an operation target, it is required that the user remembers the current mode of a communication device that is a change destination, or re-recognizes the mode from a content displayed on a screen of the communication device. In addition, the number of modes to pay attention to is increased with an increase in the number of used communication devices, so that it is probable that the usability of the communication devices is reduced.

In addition, in a situation in which a plurality of users uses a plurality of communication devices for a cooperative work, the operated communication devices may be exchanged between the users for the work. When the communication devices are exchanged, it is troublesome for the users to recognize the current modes set to the communication devices. Such setting of the modes for the respective communication devices causes a reduction in the usability.

For the above-described problem of the modes in the case in which the plurality of users uses the plurality of communication devices for the cooperative work, a method is considered in which a mode is managed for each user, and the mode for each of the users is reflected on communication devices operated by the user. As a result, the user may perform the operation in a consistent mode, regardless of a communication device to be operated. The technologies in the related arts are discussed, for example, in Japanese Laid-open Patent Publication No. 2013-200775, Japanese Laid-open Patent Publication No. 07-66956, and Japanese Laid-open Patent Publication No. 2007-140590.

SUMMARY

According to an aspect of the invention, a control system comprising: a server and a plurality of communication devices, wherein the server stores first mode information for each user, the first mode information being associated with a mode of an application and selected from among a plurality pieces of mode information of the mode, and transmits the first mode information of a first user to the plurality of communication devices operated by the first user, and the plurality of communication devices receive the first mode information, obtain second mode information set to the mode of the application installed to the communication device, record an operation content related to mode information change performed on the communication device, and determine whether the second mode information set to the mode of the application is switched to the first mode information, based on the operation content, the first mode information, and the second mode information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are diagrams illustrating examples of a management table between users and user communication devices;

FIG. 6 is a diagram illustrating an example of operation recording data;

FIG. 7 is a diagram illustrating an example of a mode synchronization determination table;

FIG. 8 is a diagram illustrating an example of a management table including history information;

DESCRIPTION OF EMBODIMENTS

Figure 1:
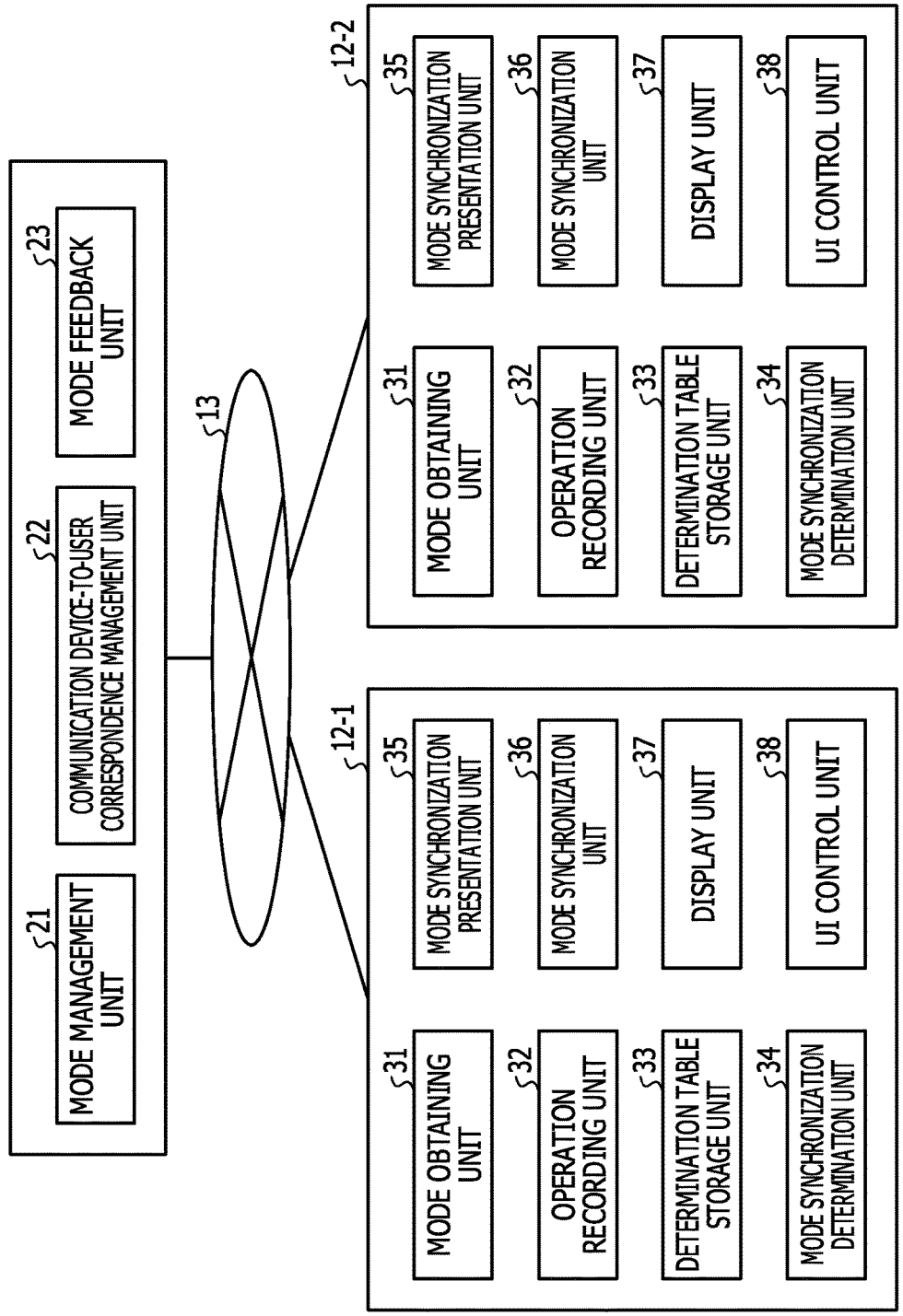
FIG. 1 is a diagram illustrating an example of a schematic configuration of a mode synchronization system.

It may not be effective that mode synchronization is started at the same timing as start of an operation of a communication device by each user, and the mode managed for each of the users is reflected on operated communication devices. For example, in an application used to input a handwritten note, due to a mode used to determine whether the handwritten note is made public, the handwritten note may be made public or private depending on an operated communication device. There is a case in which the operation is performed efficiently when synchronization of the modes related to "public/private" function is not performed. In addition, as long as drawing modes (for example, the color, the thickness, and the like at the time of drawing) are matched between the communication devices, the drawing is allowed to be performed with the consistent color, thickness, and the like, so that the operation is performed efficiently when the synchronization of the drawing modes is performed.

An object of an embodiment is to optimize mode synchronization between a plurality of communication devices.

The embodiments are described below with reference to drawings.

<Schematic Configuration Example of a Mode Synchronization System>

FIG. 1 is a diagram illustrating an example of a schematic configuration of a mode synchronization system. A mode synchronization system 10 illustrated in FIG. 1 includes a management server 11 and a plurality of communication devices 12-1 and 12-2 (hereinafter collectively referred to as "communication device 12" as appropriate). The management server 11 and the communication device 12 are examples of information processing devices. The number of communication devices 12 are not limited to two in the mode synchronization system 10, and the mode synchronization system 10 may include three or more communication devices 12.

The management server 11 and the communication device 12 are coupled to each other, for example, so that transmission and reception of data are allowed to be performed through a communication network 13 between the management server 11 and the communication device 12. The communication network 13 is, for example, the Internet, a local area network (LAN), or the like, but the embodiment is not limited to such examples. The communication network 13 may be wired or wireless, or a combination of both.

The management server 11 manages a correspondence relationship between each user who uses the communication device 12 and mode information set for each user. In addition, the management server manages the user who is operating the communication device 12. The information to be managed by the management server 11 may be obtained from the communication device 12, and in response to an inquiry from the communication device 12, the corresponding information may be extracted and transmitted to the communication device 12.

The management server 11 may be, for example, a personal computer (PC), a cloud server constituted by cloud computing including at least one information processing device, or the like, but the embodiment is not limited to such examples.

Each of the communication devices 12-1 and 12-2 stores a plurality of applications. The communication device 12 displays a user interface screen, presents the screen to the user, and accepts an input of a certain operation from user to start and end the corresponding application, and execute various pieces of processing, and the like using the application.

In addition, for example, when the user uses the two communication devices 12-1 and 12-2, the mode synchronization in the embodiment is performed using the management server 11. Here, "mode" is used to distinguish functions, for example, in a case in which a different function is executed depending on a program even when the user performs an identical operation, and "mode" does not correspond to an operation target of the user, but the embodiment is not limited to such an example. As an example of "mode" in the embodiment, for example, there is a drawing mode of a typical graphic editing program (including a pen mode, an eraser mode, and the color and the thickness of the pen mode) and the like. The operation target at that time is not a pen or an eraser, but a graphic canvas. In addition, when copy and paste operations are performed, a paste result is different depending on a content of a clip board (storage area of the copied information), so that the content of the clip board may be regarded as "mode" in the embodiment.

In addition, "operation" in the above-described mode definition is an approach to the user interface by the user, and corresponds to, for example, a click operation or a drag operation, or the like. In addition, "function" is, for example, a logical job, and for example, corresponds to "to open a file", "to draw a line", or the like.

The communication device 12 obtains the current mode information. In addition, the communication device 12 obtains an operation that has been performed on the communication device 12 that is currently being operated by the user, and performs recording of the operation. In addition, the communication device 12 performs the mode synchronization so that mode information that has been associated with the user managed by the management server 11 and the mode of the communication device 12 are caused to be matched with each other.

For example, the communication device 12 may store a table used to determine whether the current mode and the mode of the user obtained from the management server 11 are caused to be matched with each other. In this case, for the user who is currently operating the communication device, the communication device 12 may determine whether the current mode and the mode of the user are caused to be matched with each other, based on the history of the performed operation, the current mode of the communication device 12 that is the operation target, the mode set to the user who has been obtained from the management server 11, and the above-described table. In addition, each of the communication devices 12 may manage a mode that is allowed to be used for the communication device and determine whether the mode synchronization is performed, based on the above-described available mode, the operation by the user for the communication device, and the mode set to the user who has been obtained from the management server 11.

The communication device 12 is, for example, a tablet, a smartphone, a personal digital assistant (PDA), a PC, a notebook PC, or the like, but the embodiment is not limited to such examples. For example, the communication device 12 may be a device in which communication is allowed such as a television (TV), a projector, a head mounted display (HMD), game equipment, a mobile phone, or the like. In addition, the communication devices 12-1 and 12-2 illustrated in FIG. 1 may be the identical types of devices (for example, tablets), or may be the different types of devices (for example, a tablet and a notebook PC).

The function configuration examples of the above-described management server 11 and the communication device 12 are described below with reference to drawings.

<Function Configuration Example of the Management Server 11>

The management server 11 illustrated in FIG. 1 includes a mode management unit 21, a communication device-to-user correspondence management unit 22, and a mode feedback unit 23.

The mode management unit 21 manages a correspondence relationship between each user and mode information. The mode management unit 21 manages, for example, the type of a communication device used by each of the users, the attribute of a mode, mode information (content) corresponding to the attribute, and the like, but the embodiment is not limited to such examples. In addition, the mode management unit 21, for example, manages information indicating whether the mode synchronization is performed automatically or manually, for each of the communication devices 12.

The communication device-to-user correspondence management unit 22 identifies a communication device 12 that is currently being operated by the user, and manages the correspondence relationship between the user and the communication device 12. The method in which the communication device 12 operated by the user is identified is a certain method. For example, the communication device-to-user correspondence management unit 22 may identify the communication device 12 operated by the hand of the user, based on whether the position of the hand of the user who operates the communication device 12 and the position of the communication device 12 are matched with each other, using a function that traces the position of the hand of the user and the position of the communication device 12.

For example, the communication device-to-user correspondence management unit 22 may identify the communication device 12 that is the operation target of the user, for example, using a method in which a user who has touched a table-like touch panel device or the like provided in the communication device 12 is identified by identifying the direction in which the finger of the user has touched the table-like touch panel device (for example, "Hong Zhang, Xing-Dong Yang, Barrett Ens, Hai-Ning Liang, Pierre Boulanger, and Pourang Irani. See Me, See You: A Lightweight Method for Discriminating User Touches on Tabletop Displays. In Proc. of CHI' 12. ACM, 2327-2336 (2012)").

In addition, the communication device-to-user correspondence management unit 22 may identify the communication device 12 that is the operation target of the user, for example, using a method in which the user is identified by a wrist band, a ring, a watch or the like that emits infrared used to identify the user (for example, "Tobias Meyer and Dominik Schmidt. Id Wristbands: IR-based User Identification on Multi-touch Surfaces. In Proc. of ITS'10. ACM, 277-278 (2010)", but the embodiment is not limited to such an example.

In addition, the communication device-to-user correspondence management unit 22 manages the correspondence relationship between the user and the communication device 12 using a management table or the like, and transmits the management table in response to an obtaining request from the communication device 12. In addition, when the correspondence relationship between the user and the communication device 12 is changed, the communication device-to-user correspondence management unit 22 may notify the communication device 12 operated by the user of information indicating the change, the changed content (update information), and the like.

The mode feedback unit 23 obtains information on a menu or the like associated with the communication device 12 on which an operation related to the mode change or an operation other than the operation related to the mode change is performed, and displays the obtained information on another location. The mode feedback unit 23 causes the user to visually recognize the mode that is currently being selected temporarily, for example, by illuminating the information on the mode or the like that has been selected by the operation of the user, on the arm of the user. In addition, the mode feedback unit 23 may display the mode information or the like of the communication device 12, on a watch type device (smart device) that has been put on the wrist of the user.

For the above-described processing in the mode feedback unit 23, a method may be used that is discussed, for example, in "Takamasa Adachi, Seiya Koura, Fumihisa Shibata, and Asako Kimura. Forearm menu: Using Forearm as Menu Widget on Tabletop System. In Proc. of ITS'13. ACM, 333-336 (2013)", "Xiang 'Anthony' Chen, Tovi Grossman, Daniel J. Wigdor, and George Fitzmaurice. Duet: Exploring Joint Interactions on a Smart Phone and a Smart Watch. In Proc. CHI'14. ACM, 159-168. (2014)", and the like, but the embodiment is not limited to such examples.

<Function Configuration Example of the Communication Device 12>

A function configuration example of the communication device 12 is described below. The communication device 12 illustrated in FIG. 1 includes a mode obtaining unit 31, an operation recording unit 32, a determination table storage unit 33, a mode synchronization determination unit 34, a mode synchronization presentation unit 35, a mode synchronization unit 36, a display unit 37, and a user interface control unit (UI control unit) 38. Each of the communication devices 12 has the above-described configuration, so that all of the communication devices 12 are described below together.

The mode obtaining unit 31 obtains mode information set to an application of the communication device 12 operated by the user. The mode information is, for example, information indicating an attribute and a mode set to the attribute, for a function included in the application that is currently being used, and includes one or a plurality of modes.

In addition, when execution of an operation related to mode change is notified from the operation recording unit 32, the mode obtaining unit 31 may execute processing in which the mode is obtained. When there is a change in the obtained mode as compared with the mode at the previous obtaining timing, the mode obtaining unit 31 notifies the mode synchronization determination unit 34 that executes the mode in the communication device, of the changed mode.

The operation recording unit 32 obtains the content of the operation that has been performed on the communication device 12 that is currently being operated by the user, and performs recording of the operation content. As the operation content, for example, the current mode of the communication device 12 is recorded, and history information may be recorded with the time information.

In addition, the operation recording unit 32 records, for example, information on the operation related to mode change. For example, when at least one operation content, from among the operation contents recorded at the present time, is changed, the operation recording unit 32 notifies the mode obtaining unit 31 that the operation related to the mode change has been performed. In addition, the operation recording unit 32 may discard the recorded information of the operation content, and for example, may discard information on the operation that has been recorded previously as compared with the time set in advance (operation history in the past).

The determination table storage unit 33 stores a table used to determine whether the mode synchronization is started between the communication devices 12, based on the current mode of the communication device 12, which is obtained by the mode obtaining unit 31, and the mode of the user who is currently operating the communication device 12, which has been obtained from the mode management unit 21 of the management server 11.

The mode synchronization determination unit 34 determines the start of the mode synchronization, based on the current mode of the communication device, the mode of the user who is currently operating the communication device, which has been obtained from the mode management unit 21 of the management server 11, the current operation content in the communication device, and the like. For example, the mode synchronization determination unit 34 determines whether the current mode of the communication device 12 and the user mode are caused to be matched with each other, for the user who is currently operating the communication device 12, based on an operation or a series of operations that has been recorded to the operation recording unit 32, the current mode of the communication device 12, which has been obtained by the mode obtaining unit 31, the user mode that has been obtained by the mode management unit 21 of the management server 11, and the table that has been recorded to the determination table storage unit 33. The mode synchronization determination unit 34 determines whether the mode synchronization is started between the used communication devices 12, based on the above-described pieces of information.

For example, when a change in a correspondence relationship between the user and the communication device is detected, or when the mode information for the communication device 12 in the correspondence relationship with the user managed in advance is changed, the mode synchronization determination unit 34 may determine that the mode synchronization is performed so that the mode information associated with the user and the current mode information of the communication device 12 are caused to be matched with each other.

The mode synchronization presentation unit 35 presents, to the user, that the modes are caused to be matched with each other, through the display unit 37 or the like, based on the determination result by the mode synchronization determination unit 34. In addition, the mode synchronization presentation unit 35 may present the start of the mode synchronization, to the user, through the display unit 37 or the like.

In addition, the mode synchronization presentation unit 35 may present, to the user, whether the mode synchronization is performed, through the display unit 37 or the like, and display a pop-up screen or the like that accepts the answer.

The mode synchronization unit 36 performs the mode synchronization so that the mode associated with the user managed by the mode management unit 21 and the mode of the communication device 12 are caused to be matched with each other. For example, the mode synchronization unit 36 performs the mode synchronization so that the user mode information and the current mode information of the communication device 12 are caused to be matched with each other, based on the operation that has been recorded to the operation recording unit 32, the current mode information of the communication device 12, and the correspondence relationship between the user that has been managed in advance and mode information for the communication device 12 (user mode information). In addition, for example, when a determination result of the mode synchronization has been obtained in the mode synchronization determination unit 34, or when an instruction of the mode synchronization from the user has been received in the mode synchronization presentation unit 35, the mode synchronization unit 36 performs the mode synchronization.

For example, when an identical mode is applied to pieces of applications respectively operated in the plurality of communication devices 12, the mode synchronization unit 36 may cause the mode associated with the user and the identical mode to be matched with each other, or may cause the mode associated with the user and merely some modes from among a plurality of independent modes to be matched with each other. In addition, when it is efficient to cause the modes to be matched with each other, the mode synchronization unit 36 may display a user interface (hereinafter referred to as "UI") used to cause the modes to be matched with each other, on the display unit 37.

Here, as the method in which the modes are caused to be matched with each other, for example, there are a method in which the mode of the communication device 12 is changed to the user mode, a method in which the user mode managed by the management server 11 is changed to the mode of the communication device 12, and the like, but the embodiment is not limited to such examples. In each of the methods, for example, whether the modes are caused to be matched with each other may be determined using a determination table corresponding to the method. For example, when the modes of a plurality of communication devices 12 used by the user are caused to be matched with the user mode, the modes of the communication devices may be synchronized with each other. In addition, in a case in which the user mode is changed to the current mode of the communication device 12, and a further communication device 12 is used after that, when the mode of the further communication device 12 is changed to the user mode, the mode of the communication device 12 that has been used previously is passed to the currently-used communication device 12 as is.

The display unit 37 displays an application in the communication device 12, various icons, and the like, for the user. The display content by the display unit 37 is not limited to such examples, and for example, may display various setting screens and the like. In addition, the display unit 37 may display a screen indicating that the mode synchronization is performed, a screen presenting whether the synchronization is performed, or the like.

The UI control unit 38 controls information such as an instruction from the user and character input, and controls the content displayed on the display unit 37. For example, when the display unit 37 is like a touch panel, the UI control unit 38 may control an input of a touch content from the user (for example, a tap operation, a swipe operation, and the like).

<Hardware Configuration Example of the Management Server 11>

Figure 2:
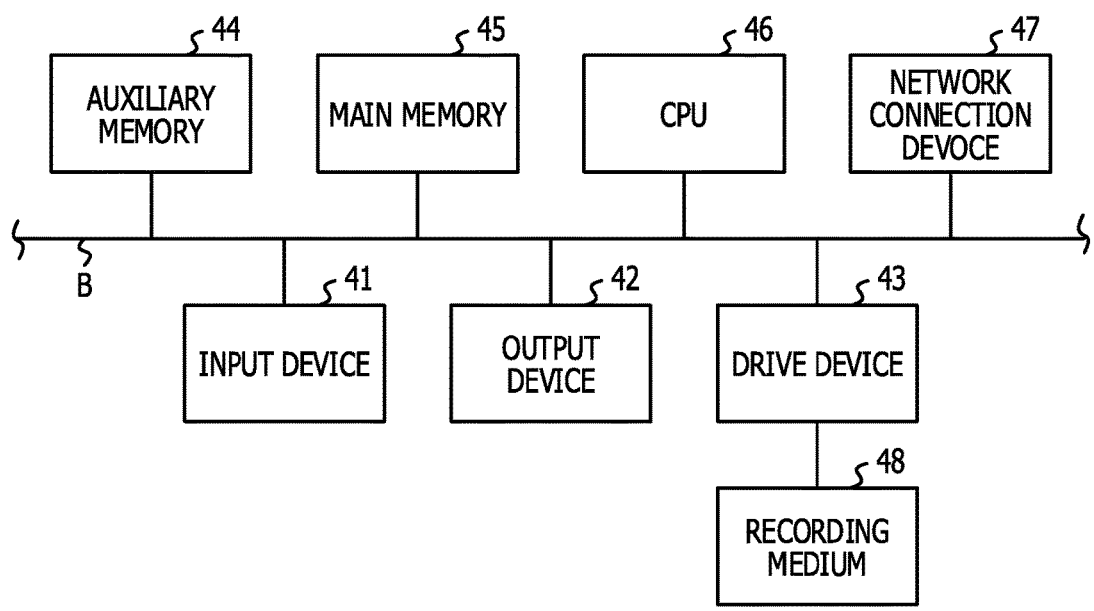
FIG. 2 is a diagram illustrating an example of a hardware configuration of a management server.

A hardware configuration example of the management server 11 that is an example of an information processing device is described below with reference to a drawing. FIG. 2 is a diagram illustrating an example of a hardware configuration of the management server. In the example of FIG. 2, the management server (computer) 11 includes an input device 41, an output device 42, a drive device 43, an auxiliary memory 44, a main memory 45, a central processing unit (CPU) 46, and a network connection device 47, and these units are coupled to each other through a system bus B.

The input device 41 includes a keyboard and a pointing device such as a mouse, and an audio input device such as a microphone operated by the user or the like such as an administrator, and accepts inputs of a program execution instruction from the user or the like, various pieces of operation information, and information used to start software, and the like.

The output device 42 includes a display that displays various windows and data and the like used for operations of a computer used to execute the processing in the embodiment. The output device 42 may display the execution progression, the result, and the like of the program, by a control program included in the CPU 46.

Here, in the embodiment, for example, the execution program is provided so as to be installed to the computer through a recording medium 48 or the like. The recording medium 48 may be set to the drive device 43. The execution program stored in the recording medium 48 is installed to the auxiliary memory 44, through the drive device 43, based on a control signal from the CPU 46.

The auxiliary memory 44 is, for example, a storage unit or the like such as a hard disk drive (HDD) or a solid state drive (SSD). The auxiliary memory 44 stores an execution program in the embodiment (mail management program), a control program provided in the computer, and the like, and performs input and output as appropriate, based on the control signal from the CPU 46. The auxiliary memory 44 may read desired information from the stored pieces of information, and perform writing, based on the control signal or the like from the CPU 46.

The main memory 45 stores the execution program and the like that has been read from the auxiliary memory 44 by the CPU 46. The main memory 45 is a read only memory (ROM), a random access memory (RAM), or the like.

The CPU 46 achieves pieces of processing by controlling the processing of the entire computer such as various pieces of calculation, and input and output of data from and to each of the hardware configuration units, based on a control program such as an operating system (OS), and the execution program stored in the main memory 45. Various pieces of information and the like desired for the execution of the programs may be obtained from the auxiliary memory 44, and the execution result and the like may also be stored in the auxiliary memory 44.

For example, the CPU 46 executes processing corresponding to the programs that have been installed to the auxiliary memory 44, on the main memory 45, for example, by causing the programs to be executed, based on a program execution instruction or the like obtained from the input device 41. For example, in the case of the communication device 12, the CPU 46 executes pieces of processing such as mode management in the mode management unit 21, correspondence management between the communication device 12 and the user in the communication device-to-user correspondence management unit 22, and mode feedback control in the mode feedback unit 23 by causing the programs to be executed. The processing content by the CPU 46 is not limited to such examples. The content that has been executed by the CPU 46 is stored in the auxiliary memory 44 or the like as appropriate.

The network connection device 47 communicates with an external device with which transmission and reception of data are allowed to be performed, through the above-described communication network 13. The network connection device 47 obtains an execution program, software, setting information, and the like, from the external device or the like so as to be coupled to the communication network 13 or the like, based on the control signal from the CPU 46. In addition, the network connection device 47 may transmit the execution result that has been obtained by executing the programs, to a further external device or the like, through the management server 11, and transmit the execution program in the embodiment to the external device or the like, as is.

The recording medium 48 is a computer readable recording medium in which the execution program and the like are stored as described above. The recording medium 48 is, for example, a semiconductor memory such as a flash memory, or a portable recording medium such as a compact disc-read only memory (CD-ROM) or a digital versatile disk (DVD), but the embodiment is not limited to such examples.

When the execution program (for example, the mode synchronization program or the like) is installed to the hardware configuration illustrated in FIG. 2, the hardware resource and the software achieve the mode synchronization processing and the like in the embodiment in cooperation.

<Hardware Configuration Example of the Communication Device 12>

Figure 3:
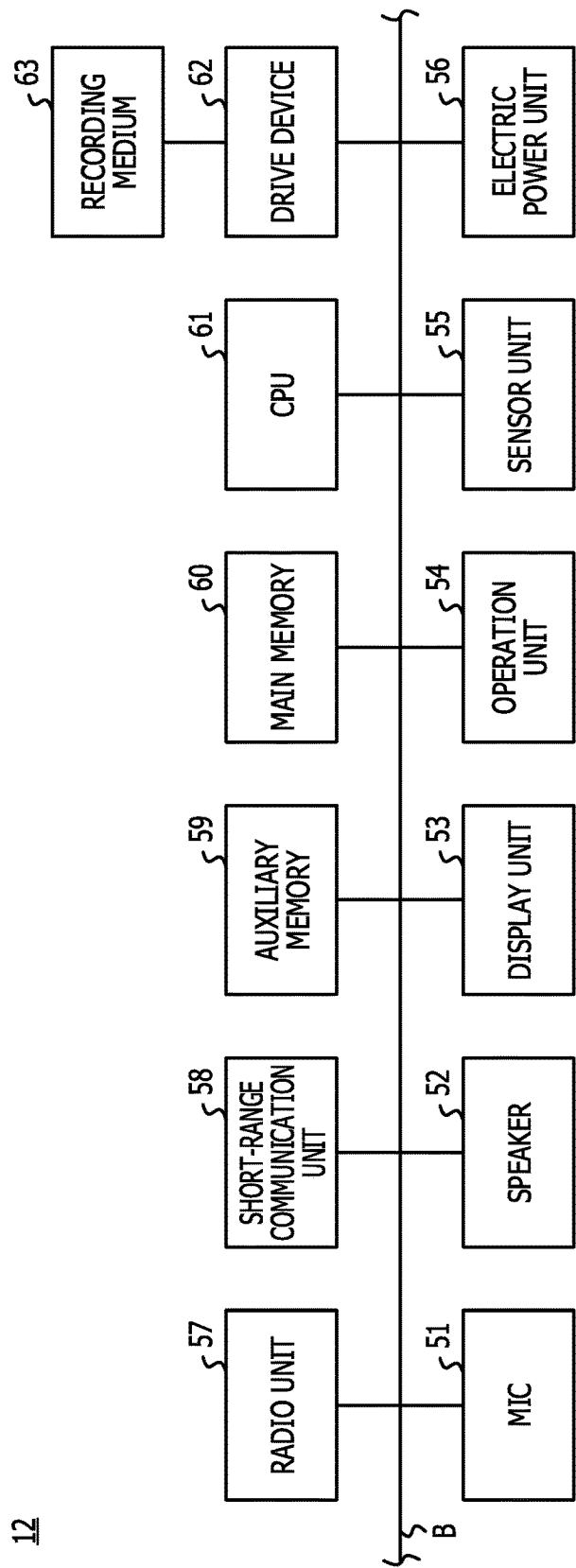
FIG. 3 is a diagram illustrating an example of a hardware configuration of a communication device.

A hardware configuration example of the communication device 12 that is an example of an information processing device is described below with reference to a drawing. FIG. 3 is a diagram illustrating an example of a hardware configuration of the communication device. In the example of FIG. 3, a communication device (computer) 12 includes a microphone (hereinafter, referred to as "mic") 51, a speaker 52, a display unit 53, an operation unit 54, a sensor unit 55, a power unit 56, a radio unit 57, a short-range communication unit 58, an auxiliary memory 59, a main memory 60, a CPU 61, and a drive device 62, and these units are coupled to each other through a system bus B.

Through the mic 51, input of audio that has been emitted by the user, and further sound is performed. The speaker 52 performs output of audio of a voice output and sounds such as a ringtone. The mic 51 and the speaker 52 may be used, for example, when conversation with a callee is performed using a calling function or the like, but the embodiment is not limited to such examples, and may be used for input and output of information by audio.

The display unit 53 displays screens that have been set by the OS and various applications, for the user. In addition, the display unit 53 may be a touch panel display or the like, and in such a case, the display unit 53 functions as an input and output unit.

The display unit 53 is, for example, a display such as a liquid crystal display (LCD) or an organic electro luminescence (EL).

The operation unit 54 is an operation button displayed on the screen of the display unit 53, an operation button provided on the exterior of the communication device 12, or the like. The operation button may be, for example, a power source button or a volume adjustment button, or may be character input operation keys arranged in certain order.

For example, when the user performs a certain operation on the screen of the display unit 53, or presses a certain operation button on the above-described operation unit 54, the tap position on the screen is detected by the display unit 53. In addition, the display unit 53 may display an application execution result, a content, an icon, a cursor, and the like, on the screen.

The sensor unit 55 detects an operation at a certain point or a continuous operation for the communication device 12. For example, the sensor unit 55 detects a tilt angle, the acceleration, the orientation, the position and the like of the communication device 12, but the embodiment is not limited to such examples. As the sensor unit 55, for example, there are a tilt sensor, an acceleration sensor, a gyro sensor, a global positioning system (GPS), and the like, but the embodiment is not limited to such examples. The power unit 56 supplies power to each of the configuration units of the communication device 12. The power unit 56 is, for example, an internal power source such as a battery, but the embodiment is not limited to such an example. The power unit 56 may detect a power amount regularly or at certain time intervals, and may monitor the remaining amount or the like of the power amount.

The radio unit 57 is, for example, an communication data transceiver unit that receives a radio signal (communication data) from a base station using an antenna or the like, and transmits a radio signal to the base station through the antenna. Due to the radio unit 57, transmission and reception of data with the management server 11 is performed through the base station or the like using the communication network 13.

For example, the short-range communication unit 58 may perform short-range communication with a computer such as a further communication device 12, using a communication method such as infrared communication, Wi-Fi (registered trademark), Bluetooth (registered trademark), or the like. The above-described radio unit 57 and short-range communication unit 58 are communication interfaces through each of which transmission and reception of data with the further computer are allowed to be performed.

The auxiliary memory 59 is, for example, a storage unit such as a HDD or an SSD. The auxiliary memory 59 stores various programs and the like, and performs input and output of data as appropriate.

The main memory 60 stores an execution program and the like that have been read from the auxiliary memory 59, in response to an instruction from the CPU 61, and stores various pieces of information and the like obtained in the middle of program execution. The main memory 60 is, for example, a ROM, a RAM, or the like, but the embodiment is not limited to such examples.

The CPU 61 achieves pieces of processing in display control by controlling the processing of the entire computer such as various pieces of calculation and input and output of data to and from each of the hardware configuration units, based on the control program such as an OS, and the execution program stored in the main memory 60.

For example, the CPU 61 executes processing corresponding to the programs that have been installed to the auxiliary memory 59, on the main memory 60, for example, by causing the programs to be executed, based on a program execution instruction or the like obtained from the operation unit 54. For example, the CPU 61 executes pieces of processing such as mode obtaining in the above-described mode obtaining unit 31, operation recording in the operation recording unit 32, storing of a determination table in the determination table storage unit 33, mode synchronization determination in the mode synchronization determination unit 34, presentation of mode synchronization in the mode synchronization presentation unit 35, mode synchronization in the mode synchronization unit 36, and display in the display unit 37, by executing the information processing program. The processing content in the CPU 61 is not limited to the above-described contents. The contents that have been executed by the CPU 61 are stored in the auxiliary memory 59 or the like as appropriate.

For example, a recording medium 63 and the like may be set to the drive device 62 removably, and reading of various pieces of information that has been recorded to the recording medium 63 may be performed, and certain information may be written to the recording medium 63. The drive device 62 is, for example, a medium loading slot or the like, but the embodiment is not limited to such examples.

The recording medium 63 is a computer readable recording medium that stores the execution program and the like as described above. The recording medium 63 may be, for example, a semiconductor memory such as a flash memory. In addition, the recording medium 63 may be a portable recording medium such as a USB memory, but the embodiment is not limited to such an example.

When the execution program (for example, the mode synchronization program or the like) is installed to the hardware configuration illustrated in FIG. 3, the hardware resource and the software may achieve the mode synchronization and the like in the embodiment processing in cooperation.

<Overview Example of the Mode Synchronization>

Figure 4:
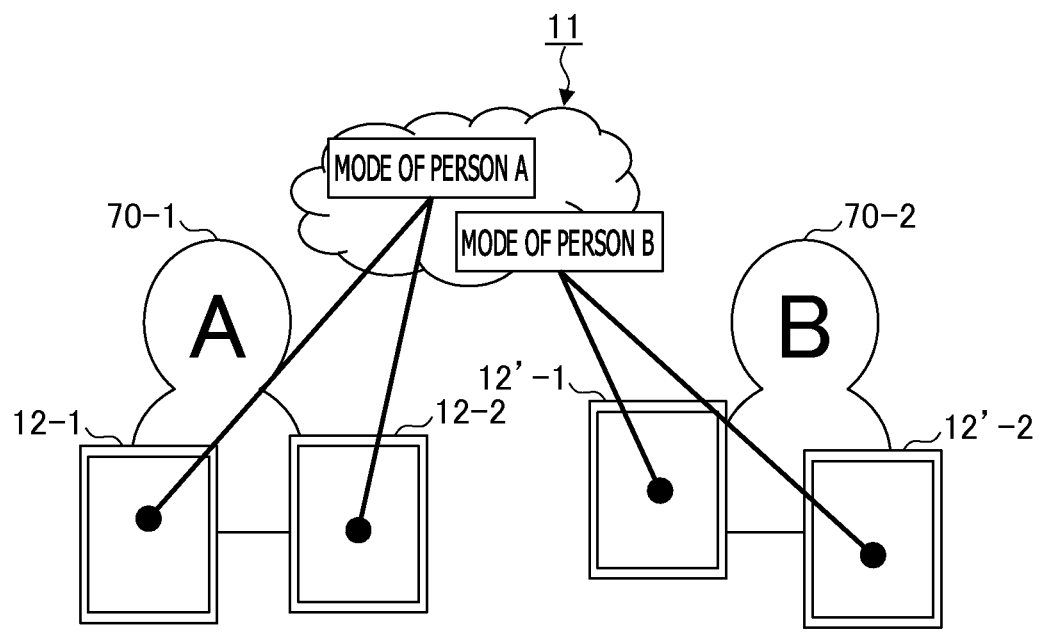
FIG. 4 is a diagram illustrating the outline of mode synchronization in an embodiment.

The overview example of the mode synchronization in the embodiment is described below. FIG. 4 is a diagram illustrating the outline of the mode synchronization in the embodiment. In the example of FIG. 4, the user 70-1 uses two communication devices 12-1 and 12-2, and the user 70-2 uses two communication devices 12'-1 and 12'-2. The mode management unit 21 of the management server 11 manages a used mode for each of the users, and reflects the mode on the communication devices 12 operated by the corresponding user.

In the embodiment, the mode synchronization is performed between the communication devices 12-1 and 12-2 by the user 70-1 (person A). In addition, the mode synchronization is performed between the communication devices 12'-1 and 12'-2 by the user 70-2 (person B). In the embodiment, attention does not have to be paid to the mode set to the individual communication device 12, and an identical mode may be used so as to be shared between the plurality of communication devices 12. In addition, in the embodiment, when the communication device 12-1 is used by a further user (for example, person C), the mode of the communication device 12-1 may be changed to the mode of the user (person C), based on the information managed by the management server 11.

<Example Corresponding to "Mode">

Here, a specific example corresponding to "mode" in the embodiment is described below. As the example corresponding to "mode", there are a pen tool, an eraser tool, and the like of image editing software (for example, "paint" and the like of Windows (registered trademark)), in which a function of the pen tool or the eraser tool is distinguished so that a different function such as "to draw a line" or "to erase" is executed even by an identical operation (for example, a drag operation) on a canvas. At this time, "drag operation" is performed on the canvas, and is not performed on icons used to select the pen tool or the eraser tool, so that the pen tool and the eraser tool of the image editing software or the like correspond to "example that is used to distinguish a function when an identical operation performed by the user causes a different function to be executed, and is not the operation target of the user", in the above-described mode definition. Thus, the above-described pen tool and eraser tool of the image editing software or the like correspond to "mode" in the embodiment.

In addition, when an identical operation is performed on the canvas (for example, drag operation), a different line is drawn depending on the attribute of the color and the thickness of the pen of the image editing software. This may be also regarded as "different function". At this time, "drag operation" is performed on the canvas, and is not performed on icons used to select the color and the thickness, so that the attribute of the color and the thickness of the pen of the image editing software corresponds to "example that is used to distinguish a function when an identical operation performed by the user causes a different function to be executed, and is not the operation target of the user", in the above-described mode definition. Thus, the above-described attribute of the color and the thickness of the pen of the image editing software corresponds to "mode" in the embodiment.

In addition, in a selection or deletion mode of an icon (in which the icon becomes in a selection state or is deleted when the icon has been clicked), a different function is executed in which the icon becomes in "selection state" or is "deleted" when an identical operation (for example, the click operation) is performed on the icon. At this time, "click operation" is performed on the icon, and is not performed on a menu used to select the selection mode or the deletion mode, so that the selection or deletion mode of the icon corresponds to "example that is used to distinguish a function when an identical operation performed by the user causes a different function to be executed, and is not the operation target of the user", in the above-described mode definition. Thus, the above-described selection or deletion mode of the icon corresponds to "mode" in the embodiment.

In addition, in a clip board (for example, a location in which data is temporarily stored when an image, a sentence, or the like is copied), a different result is obtained depending on a content of the clip board, for "paste operation" (for example, an operation in which a paste menu is selected by performing "right click" or the like), thereby being regarded as a different function. In addition, the paste operation is performed on a document of a paste destination, and is not performed on the clip board, so that the clip board corresponds to "example that is used to distinguish a function when an identical operation performed by the user causes a different function to be executed, and is not the operation target of the user", in the above-described mode definition. Thus, the above-described clip board corresponds to "mode" in the embodiment. The example corresponding to the mode is not limited to such examples.

<Example not Corresponding to "Mode">

In addition, as an example not corresponding to "mode" in the embodiment, for example, there is a menu or a button indicating the function of a save button or the like of the image editing software, and the same function is executed whenever the button or the menu has been clicked. Here, the same function that is "to save the displayed canvas" whenever the save button has been clicked. At this time, "save button" is clicked, and is an operation (click) target, so that the button or the menu indicating the function of the save button or the like does not correspond to "example that is not the operation target of the user" in the above-described mode definition. Thus, the button or the menu indicating the function of the save button or the like does not correspond to "mode" in the embodiment.

In addition, even in a transmission button of mail software, the same function that is "to transmit the displayed mail" is executed whenever the transmission button has been clicked. At this time, the transmission button is clicked, and is an operation (click) target, so that the transmission button of the mail software does not correspond to "example that is not the operation target of the user" in the above-described mode definition. Thus, the transmission button of the mail software does not correspond to "mode" in the embodiment.

In addition, in a case of a deletion menu or the like displayed by performing "right click" in a web browser or the like, an identical function "to delete an icon with which the menu is associated" is executed whenever the deletion menu has been clicked. At this time, the deletion menu is clicked, and is an operation target, so that the deletion menu does not correspond to "example that is not the operation target of the user" in the above-described mode definition. Thus, the deletion menu or the like displayed by performing "right click" in the web browser or the like does not correspond to "mode" in the embodiment. The example not corresponding to "mode" in the embodiment is not limited to such examples.

<Various Table Examples>

Data examples used in the embodiment are described below with reference to drawings. FIGS. 5A and 5B are diagrams illustrating examples of management tables between the users and the user communication devices. The management table illustrated in FIG. 5A is a table managed by the mode management unit 21. The management table illustrated in FIG. 5B is a table managed by the communication device-to-user correspondence management unit 22.

The mode management unit 21 manages information for a mode of each user. In the example of FIG. 1, the mode management unit 21 is included in the management server 11, but may be provided on the communication device 12 side. The mode management unit 21 manages the modes of the users using the management tables as illustrated in FIGS. 5A and 5B. In addition, the mode management unit 21 obtains information from the management tables illustrated in FIGS. 5A and 5B or updates the data stored in the management tables in response to an obtaining request or in accordance with update of the mode.

The items of the management table illustrated in FIG. 5A include, for example, "user information", "communication device type", "attribute", and "mode information", but the embodiment is not limited to such examples.

Here, "user information" indicates identification information of a target user who manages a mode. Here, "communication device type" indicates identification information of a target communication device to which the mode is set by each of the users. For example, when "communication device type" corresponds to "*", it is indicated that the operation is performed with the mode for a certain communication device. In addition, in "communication device type", an identical identifier may be used between a plurality of communication devices. However, in the management table, in a case in which "communication device type" includes data (row) in which an individual identifier of a communication device is specified, when the communication device indicated by the identifier is operated, the mode set in "mode information" of the data (row) is applied so as to be prioritized.

Here, "attribute" indicates the type (mode category) or the like of mode information indicated by "mode information". For example, "attribute" includes an attribute indicating whether information is made public or private in the communication device 12 used by the user and an attribute of the color, the thickness, and the like in the case of a drawing application, but the embodiment is not limited to such examples.

In the mode management in the embodiment, for example, it is assumed that the two users (users A and B) use two communication devices (client 1 and client 2). With reference to the management table of FIG. 5A, for example, it is indicated the user A operates the communication device 12 of the client 1 with the mode information "public" of the attribute "public/private" and the mode information "pen (red, thickness 2)" of the attribute "drawing (color)". In addition, it is also indicated that the user A operates the communication device 12 of the client 2 with the same modes. As a result, the mode synchronization is performed between the communication devices.

In addition, when the user B operates the client 1, in the management table of FIG. 5A, pieces of data (row) of "*" and "client 1" of "communication device type" exist, and the identical attribute "public/private" is set to the pieces of data. In this case, it is indicated that the user B operates the client 1 with "public" and "eraser" mode using the prioritized and applied mode information, and the user B operates the client 2 with "private" and "eraser" mode.

In addition, the items of the management table illustrated in FIG. 5B include "user information" and "communication device type", but the embodiment is not limited to such examples.

As described above, the communication device-to-user correspondence management unit 22 identifies a communication device that is currently being operated by the user, and manages the correspondence relationship between the user and the communication device 12. The processing in the communication device-to-user correspondence management unit 22 is executed, for example, on the management server 11 side, as illustrated in FIG. 1.

The mode synchronization determination unit 34 on the communication device 12 side, to which the management tables illustrated in FIGS. 5A and 5B have been notified, determines whether the current mode of the communication device 12 and the user mode managed by the mode management unit 21 are caused to be matched with each other, and the mode synchronization unit 36 causes the modes to be matched with each other when the modes are determined to be caused to be matched with each other. The mode synchronization unit 36 may cause the modes to be matched with each other, for example, so that the current mode of the communication device 12 is changed so as to be matched with the mode of the user managed by the mode management unit 21, or so that the mode of the user managed by the mode management unit 21 is changed so as to be matched with the current mode of the communication device 12. When the mode of the user managed by the mode management unit 21 is caused to be matched with the current mode of the communication device 12, the mode synchronization unit 36 transmits the current mode of the communication device 12 to the management server 11, and the mode management unit 21 updates the management table and the like illustrated in FIG. 5A.

In addition, the communication device-to-user correspondence management unit 22 manages the correspondence relationship between the user and the communication device 12 using the management table illustrated in FIG. 5B. In the example of FIG. 5B, it is indicated that the user A operates the client 1 and a client 3, and the user B operates the client 2.

FIG. 6 is a diagram illustrating an example of operation recording data. The operation recording data illustrated in the example of FIG. 6 is information managed by the operation recording unit 32. The items of the operation recording data include, for example, "record time" and "mode information", but the embodiment is not limited to such examples. Here, "record time" indicates a time at which an operation that has been performed on the communication device 12 that is currently being operated by the user has been recorded. In addition, "mode information" indicates a content of the operation that has been performed on the communication device 12 that is currently being operated by the user, and for example, mode information (including the attribute) and the like are recorded to "mode information", but the embodiment is not limited to such an example. For example, when the mode is changed, recording of the operation recording data may be performed, or recording of the current mode information may be performed at certain time intervals.

FIG. 7 is a diagram illustrating an example of a mode synchronization determination table. The mode synchronization determination table illustrated in the example of FIG. 7 is stored in the determination table storage unit 33. The items of the mode synchronization determination table illustrated in the example of FIG. 7 includes, for example, "current mode of the communication device", "user mode", "automatic synchronization", and "manual synchronization", but the embodiment is not limited to such examples.

Here, "current mode of the communication device" is, for example, the content of the mode set to the communication device 12 by the user at present time (for example, "attribute", "mode information", and the like). Such information indicates the current mode of the communication device 12, which has been obtained by the mode obtaining unit 31. In addition, the information stored in "current mode of the communication device" corresponds to information stored by the operation recording unit 32.

In addition, "user mode" is the content of the mode set by the user obtained from the mode management unit 21 of the management server 11 before the mode synchronization is performed (for example, "attribute", "mode information", and the like), and is one or a plurality of pieces of mode information corresponding to the user who operates the communication device 12.

To "automatic synchronization", "○" is set when the mode synchronization is performed automatically without presenting an inquiry of whether the synchronization is performed, to the user, and "x" is set when the mode synchronization is not performed automatically. In addition, in "manual synchronization", a screen used to inquire whether the mode synchronization is performed is presented, and whether the mode synchronization is performed is determined in response to the answer, and to "manual synchronization", "○" is set when the inquiry screen is displayed, and "x" is set when the inquiry screen is not displayed. When the user permits to cause both of the modes to be matched with each other, through the display screen, both of the modes are caused to be matched with each other. In addition, when "○" is set to both of "automatic synchronization" and "manual synchronization", the processing is executed based on priority order that has been set in advance. The above-described setting of "○" and "x" is not limited to such examples, and may be identified by further identification information.

For example, the above-described mode synchronization presentation unit 35 presents, to the user, information presenting whether the modes are synchronized with each other, based on the determination result of the mode synchronization determination unit 34. In the determination table illustrated in FIG. 7, when "automatic synchronization" corresponds to "○", that the mode of the communication device 12 and the user mode are caused to be matched with each other is displayed on the screen of the communication device 12. The way of the display is a certain way, but for example, the display may be performed using a dialogue box or a status bar (for example, an area or the like on which a clock, a battery, and the like, are displayed in the upper part of the screen of a smartphone communication device), but the embodiment is not limited to such examples. The displayed screen position is not limited to the communication device 12 operated by the user. For example, when a list watch type of a communication device or a glasses type of a communication device belongs to the user in addition to the communication device operated by the user, the display may be performed on such a communication device other than the operating communication device.

The mode synchronization presentation unit 35 displays a screen that allows the user to select whether the modes are caused to be matched with each other when merely "manual synchronization" corresponds to "○" in the determination table. For example, a dialogue box used to inquire whether both of the modes are caused to be matched with each other may be displayed on the communication device operated by the user. The displayed screen is not limited to the screen of the communication device being operated by the user, and may be displayed on a communication device other than the communication device being operated by the user.

In addition, the mode synchronization presentation unit 35 may update the mode synchronization determination table illustrated in FIG. 7. For example, when merely "manual synchronization" corresponds to "◯", the mode synchronization presentation unit 35 displays the dialogue box used to inquire whether both of the modes are caused to be matched with each other, and when the user performs the operation so that both of the modes are caused to be matched with each other, "automatic synchronization" of the mode synchronization determination table may be changed to "◯". In the case in which the update is performed as described above, when the mode synchronization determination table is used next, "automatic synchronization" is determined, and the user does not have to operate the dialogue box used to inquire whether both of the modes are caused to be matched with each other, so that the efficiency of the operation is improved.

In addition, when the mode synchronization unit 36 causes the mode of the communication device operated by the user and the mode of the user managed by the mode management unit 21 to be matched with each other by changing "automatic synchronization" of the mode synchronization determination table to "◯", the mode synchronization unit 36 notifies the mode management unit 21 that both of the modes have been caused to be matched with each other in the communication device 12. The mode management unit 21 to which the matching has been notified updates the management table illustrated in FIG. 5A.

For example, when data (row) in which an identifier indicating the communication device 12 is set exists in "communication device type" of the management table illustrated in FIG. 5A, the data (row) may be deleted. This is because the mode of the communication device 12 does not have to be managed individually in the table due to the setting of "automatic synchronization" when the column of "communication device" is matched with the mode of "*" in the mode of the user managed by the mode management unit 21.

In addition, an UI used to update the mode synchronization determination table may be displayed on the communication device 12 operated by the user. The UI control unit 38 displays the UI on the screen of the communication device 12 operated by the user. The UI used to update the mode synchronization determination table may be displayed so as to be associated with a UI used to change the mode.

For example, the user may change "automatic synchronization" to "x" using the UI used to update the mode synchronization determination table. Due to such change, the determination may be performed by the mode synchronization determination unit 34 so that the mode of the communication device 12 operated by the user and the mode of the user managed by the mode management unit 21 are not caused to be matched with each other automatically. As a result, the user may operate the communication devices 12 so as to set different modes to the communication devices.

Here, the mode management unit 21 according to the embodiment may execute processing in which the mode is returned to the previous mode by further managing update information or the like of the previous mode as history information, for the above-described management table illustrated in FIG. 5A.

FIG. 8 is a diagram illustrating an example of the management table including history information. The items of the management table illustrated in FIG. 8 include "synchronization" and "created time", in addition to "user information", "communication device type", "attribute", and "mode information" illustrated in FIG. 5A, but the embodiment is not limited to such examples. Descriptions of items that are the same as the management table of FIG. 5A are omitted, and the items other than the same items are described below. Here, "synchronization" indicates whether the mode synchronization has been previously performed in practice, and "◯" is set to "synchronization" when the mode synchronization has been performed, and "x" is set to "synchronization" when the mode synchronization has not been performed. In addition, "created time" indicates a time at which the data (row) has been created. The created time may be stored so as to include the date and the like. In the example of FIG. 8, rows in which pieces of "user information", "communication device types", and "attributes" are respectively the same, and "created times" are different indicate histories related to the mode.

For example, when "synchronization" corresponds to "x", the mode synchronization unit 36 of the communication device 12 that has obtained such information may not cause the modes to be matched with each other. In addition, when the mode synchronization unit 36 receives "return instruction" or the like of the mode information, from the user, the modes are caused to be matched with each other, based on the mode information that has been previously set from the management table as illustrated in FIG. 8.

<Example of the Mode Synchronization Processing>

An example of the mode synchronization processing in the embodiment is described below. In the following description, as the example of the mode synchronization processing, mode transmission processing, mode information update processing, mode obtaining processing, mode change processing, mode synchronization processing at the time of user change, and mode return processing are described below.

<Example of the Mode Transmission Processing>

Figure 9:
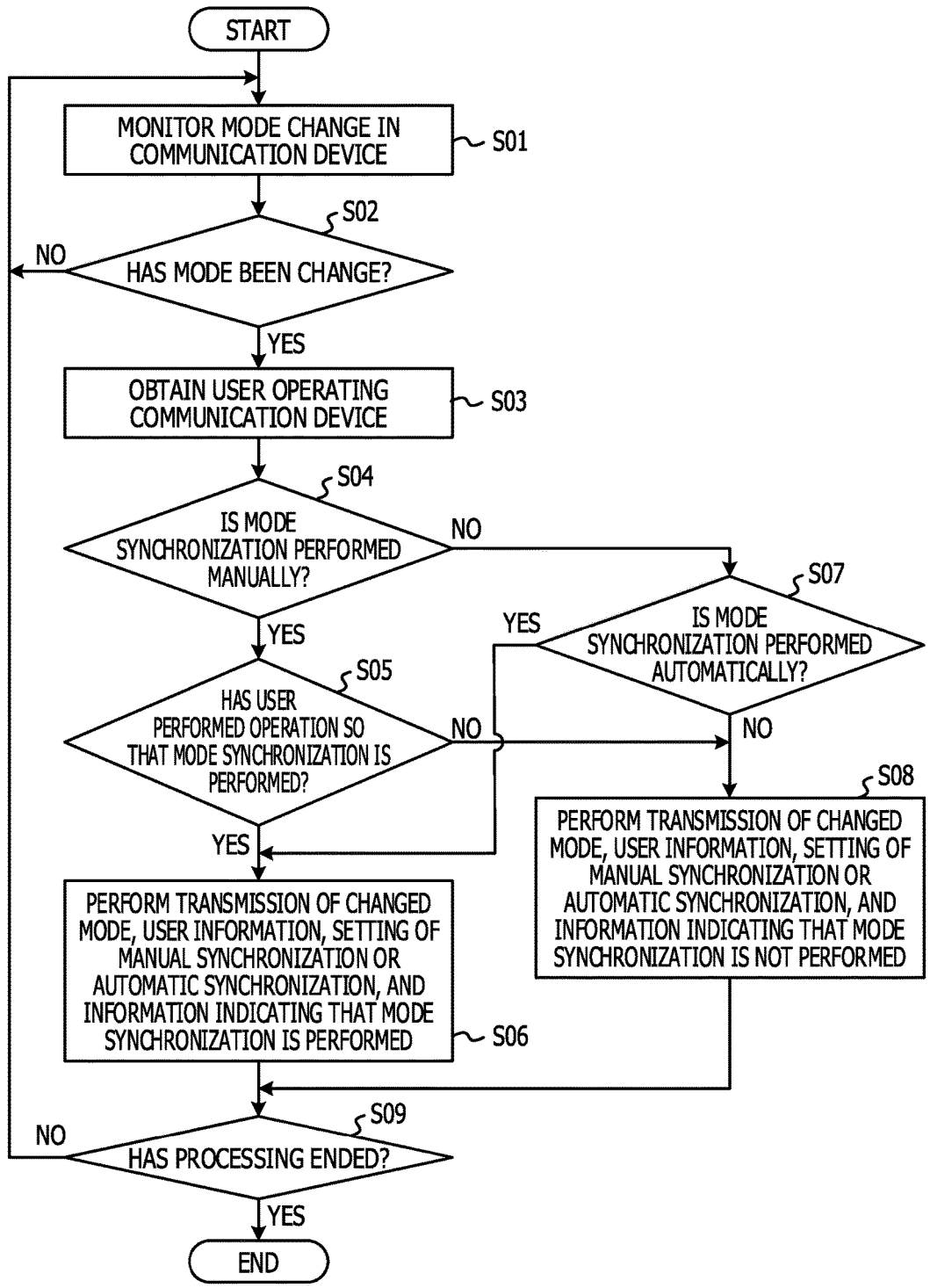
FIG. 9 is a flowchart illustrating an example of mode transmission processing.

FIG. 9 is a flowchart illustrating an example of the mode transmission processing. The processing illustrated in the example of FIG. 9 is executed on the communication device 12 side. In the example of FIG. 9, the mode obtaining unit 31 monitors mode change in the communication device 12 (S01), and determines whether the mode has been changed (S02). When the mode has been changed (YES in S02), the above-described management table or the like is obtained from the mode management unit 21 and the communication device-to-user correspondence management unit 22, and a user who is operating the communication device 12 is obtained from the management table (S03).

In addition, the mode synchronization determination unit 34 performs mode synchronization determination, using the above-described management table, the current mode of the communication device, the mode synchronization determination table stored in the determination table storage unit 33, and the like, and determines whether the mode synchronization is manually performed (S04). When the mode synchronization is performed manually (YES in S04), it is determined whether the user has performed the operation so that the mode synchronization is performed manually (S05), and when the user has performed the operation so that the mode synchronization is performed manually (S05), the changed mode, information on the user, setting of manual synchronization or automatic synchronization, and information indicating that the mode synchronization is performed (for example, "○") are transmitted to the mode management unit 21 (S06).

In addition, in the processing of S04, when the mode synchronization is not performed manually (NO in S04), the mode synchronization determination unit 34 determines whether the mode synchronization is performed automatically (S07), and when the mode synchronization is performed automatically (YES in S07), the above-described processing of S06 is executed.

In addition, in the processing of S05, when the user has not performed the operation so that the mode synchronization is performed (NO in S05), or when the mode synchronization is not performed automatically in the processing of S07 (NO in S07), the changed mode, the information on the user, the setting of manual synchronization or automatic synchronization, and information indicating that the mode synchronization is not performed (for example, "x") are transmitted to the mode management unit 21 (S08).

Here, it is determined whether the processing ends (S09), and when the processing does not end (NO in S09), the flow returns to the processing of S01. In addition, in the processing of S02, when the mode has not been changed (NO in S02), the flow returns to the processing of S01.

In addition, in S09, when the processing ends due to an instruction or the like from the user (YES in S09), the mode transmission processing ends.

<Example of the Mode Information Update Processing>

Figure 10:
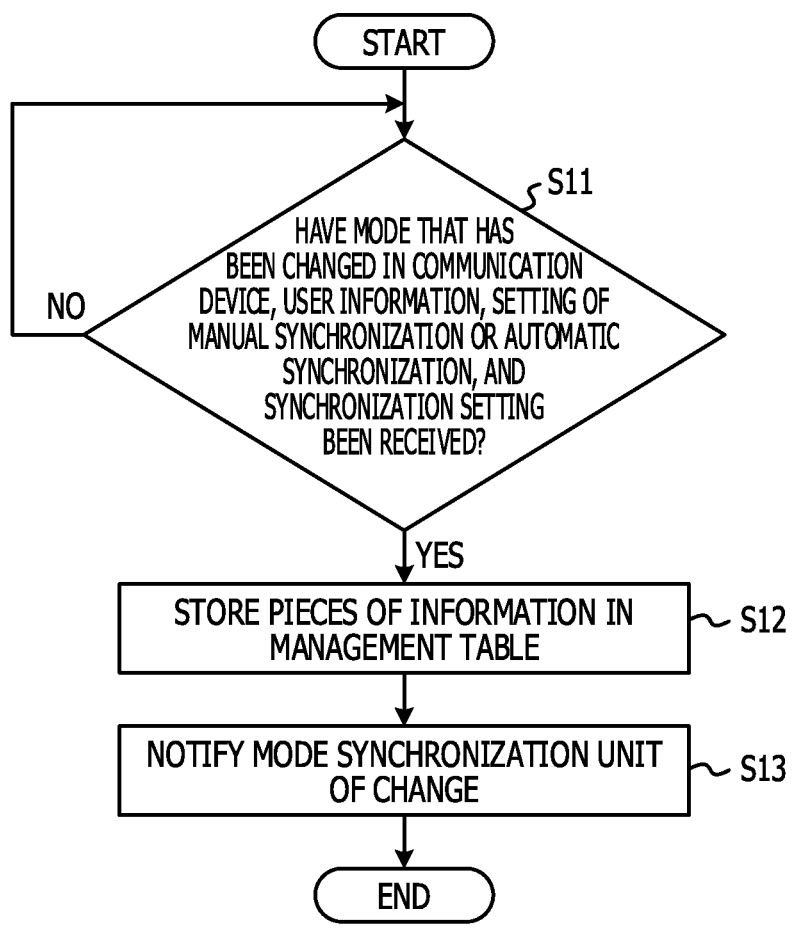
FIG. 10 is a flowchart illustrating an example of mode information update processing.

FIG. 10 is a flowchart illustrating an example of the mode information update processing. The processing illustrated in the example of FIG. 10 is executed on the management server 11 side.

In the example of FIG. 10, it is determined whether the mode that has been changed in the communication device 12, the user information, the setting of manual synchronization or automatic synchronization, and the mode synchronization setting have been received from the communication device 12 (S11), when the changed mode, the user information, the setting of manual synchronization or automatic synchronization, and the mode synchronization setting is not received from the communication device 12 (NO in S11), the state becomes the standby state until the changed mode, the user information, the setting of manual synchronization or automatic synchronization, and the mode synchronization setting are received from the communication device 12. In addition, when the changed mode, the user information, the setting of manual synchronization or automatic synchronization, and the synchronization setting have been received from the communication device 12 (YES in S11), the mode management unit 21 stores the pieces of information in the above-described management table (S12), and notifies the mode synchronization unit 36 or the like of the communication device 12 corresponding to the data, of the change (S13). When the mode management unit 21 stores the received pieces of information in the above-described management table, "communication device type" of the management table may be set based on the received pieces of information. For example, when the received information indicates that the mode synchronization is performed automatically, "*" may set to "communication device type". In addition, when the received information indicates that the mode synchronization is performed manually, identification information of the communication device 12 that has transmitted the pieces of information may be set to "communication device type". The mode synchronization may be performed so that the mode information of the communication device 12 and the mode information of the user by the management table are caused to be matched with each other, due to the update processing illustrated in FIG. 10.

<Example of the Mode Obtaining Processing>

Figure 11:
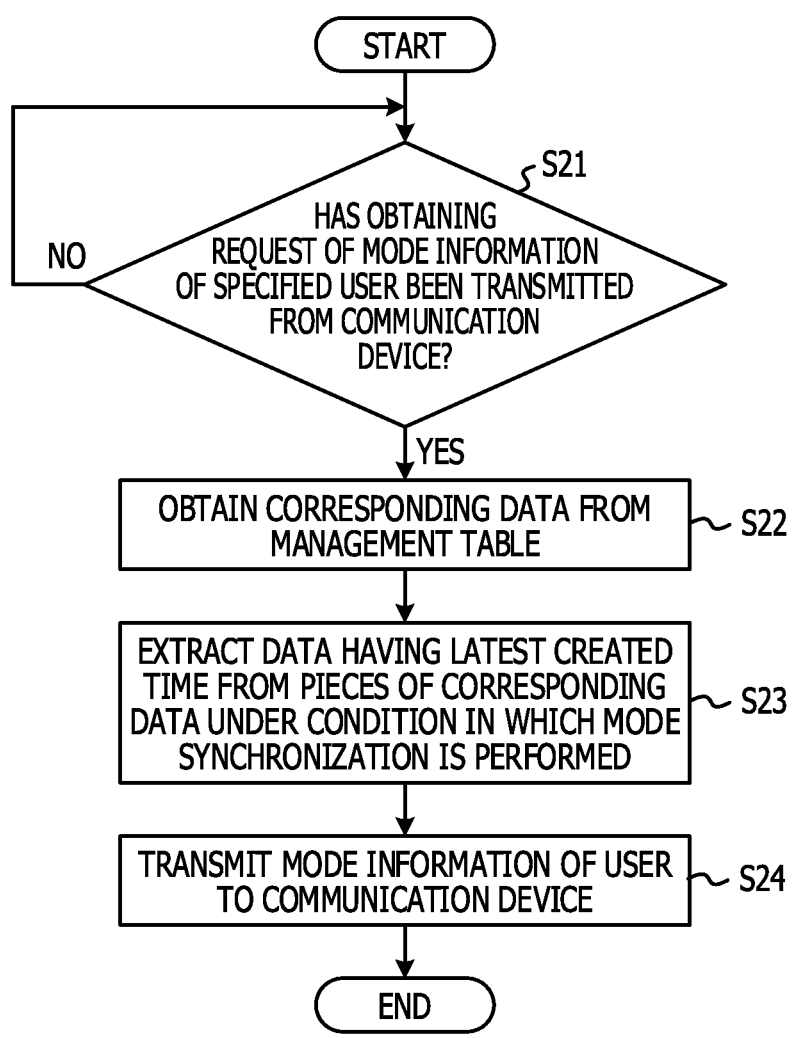
FIG. 11 is a flowchart illustrating an example of mode obtaining processing.

FIG. 11 is a flowchart illustrating an example of the mode obtaining processing. The processing illustrated in the example of FIG. 11 is executed on the management server 11 side. In the example of FIG. 11, the mode management unit 21 determines whether an obtaining request of mode information for the specified user has been transmitted from the communication device 12 (S21), when the request is not transmitted from the communication device 12 (NO in S21), the state becomes the standby state until the request is transmitted from the communication device 12. In addition, when the request has been transmitted from the communication device 12 (YES in S21), the corresponding data (row) is obtained from the management table, with reference to "user information", "communication device type", "attribute", and the like (S22).

When the management table includes the history information as illustrated in FIG. 8, data (row) having the latest created time is extracted from among the obtained pieces of data (row), under a condition in which the mode synchronization is performed (S23), and the mode information of the user is transmitted to the communication device 12 that has transmitted the request (S24). In the example of FIG. 11, for example, the user may specify the mode (for example, the attribute), and execute the above-described mode obtaining processing merely for the specified attribute.

<Example of the Mode Change Processing>

Figure 12:
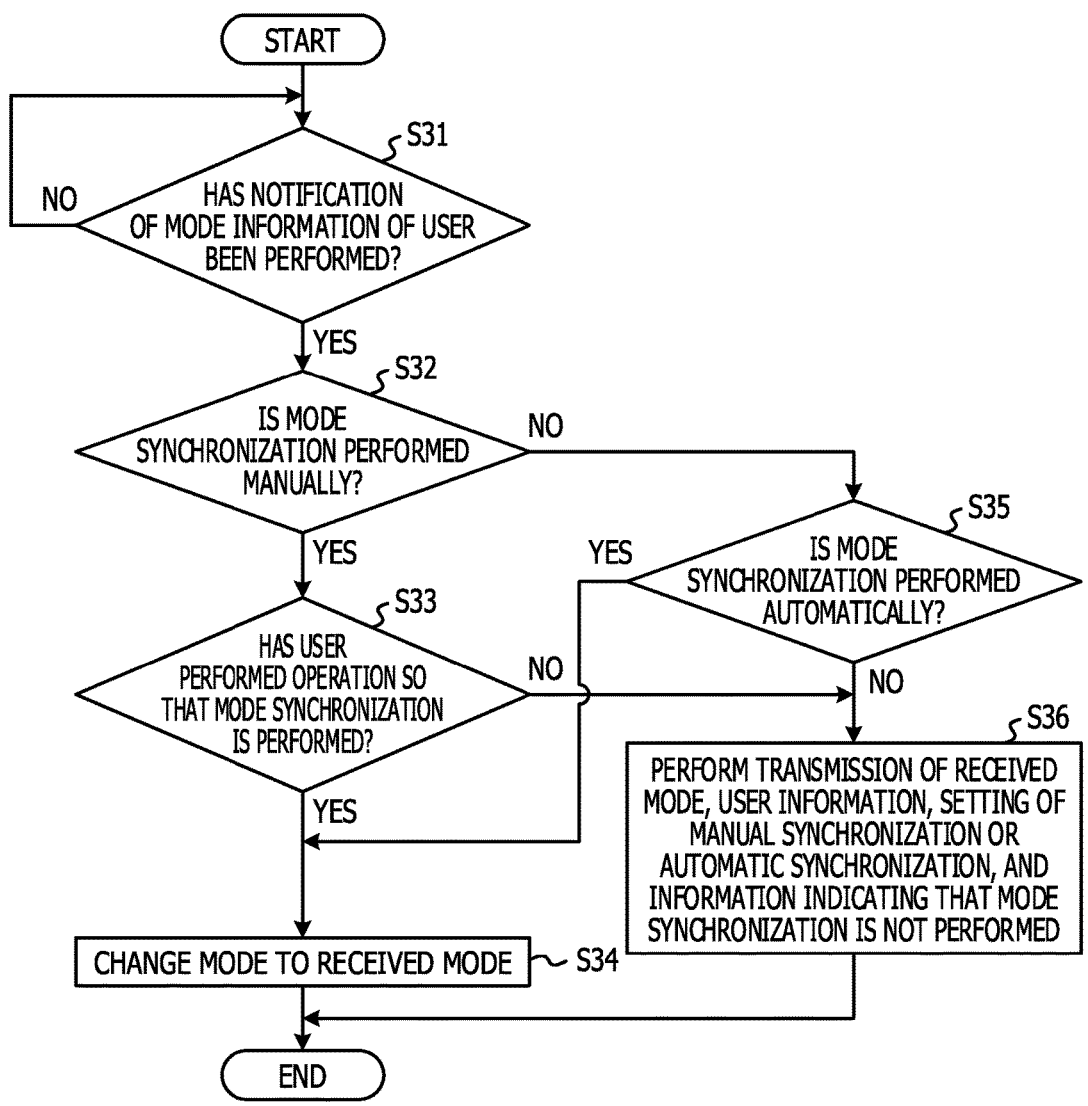
FIG. 12 is a flowchart illustrating an example of mode change processing.

FIG. 12 is a flowchart illustrating an example of the mode change processing. The processing illustrated in the example of FIG. 12 is executed on the communication device 12 side. In the example of FIG. 12, it is determined whether the user mode information (for example, including mode change information) has been notified from the mode management unit 21 (S31), and when the mode information is not notified from the mode management unit 21 (NO in S31), the state becomes the standby state until the mode information is notified from the mode management unit 21. In addition, the mode information has been notified from the mode management unit 21 (YES in S31), the mode synchronization determination unit 34 determines whether the mode synchronization is performed manually (S32), and when the mode synchronization is performed manually (YES in S32), it is determined whether the user has performed the operation so that the mode synchronization is performed (S33). When the user has performed the operation so that the mode synchronization is performed (YES in S33), the current mode information of the communication device 12 is changed so as to be caused to be matched with the received mode (S34).

In addition, in the processing of S32, when the mode synchronization is not performed manually (NO in S32), it is determined whether the mode synchronization is performed automatically (S35), when the mode synchronization is performed automatically (YES in S35), the above-described processing of S34 is executed.

In addition, when the user has not performed the operation so that the mode synchronization is performed in the processing of S33 (NO in S33), or when the mode synchronization has not been performed automatically in the processing of S35 (NO in S35), the mode and the user information that have been received from the management server 11, the setting of manual synchronization or automatic synchronization, and information indicating the synchronization is not performed are transmitted to the management server 11 (S36).

<Example of the Mode Synchronization Processing at the Time of User Change>

Figure 13:
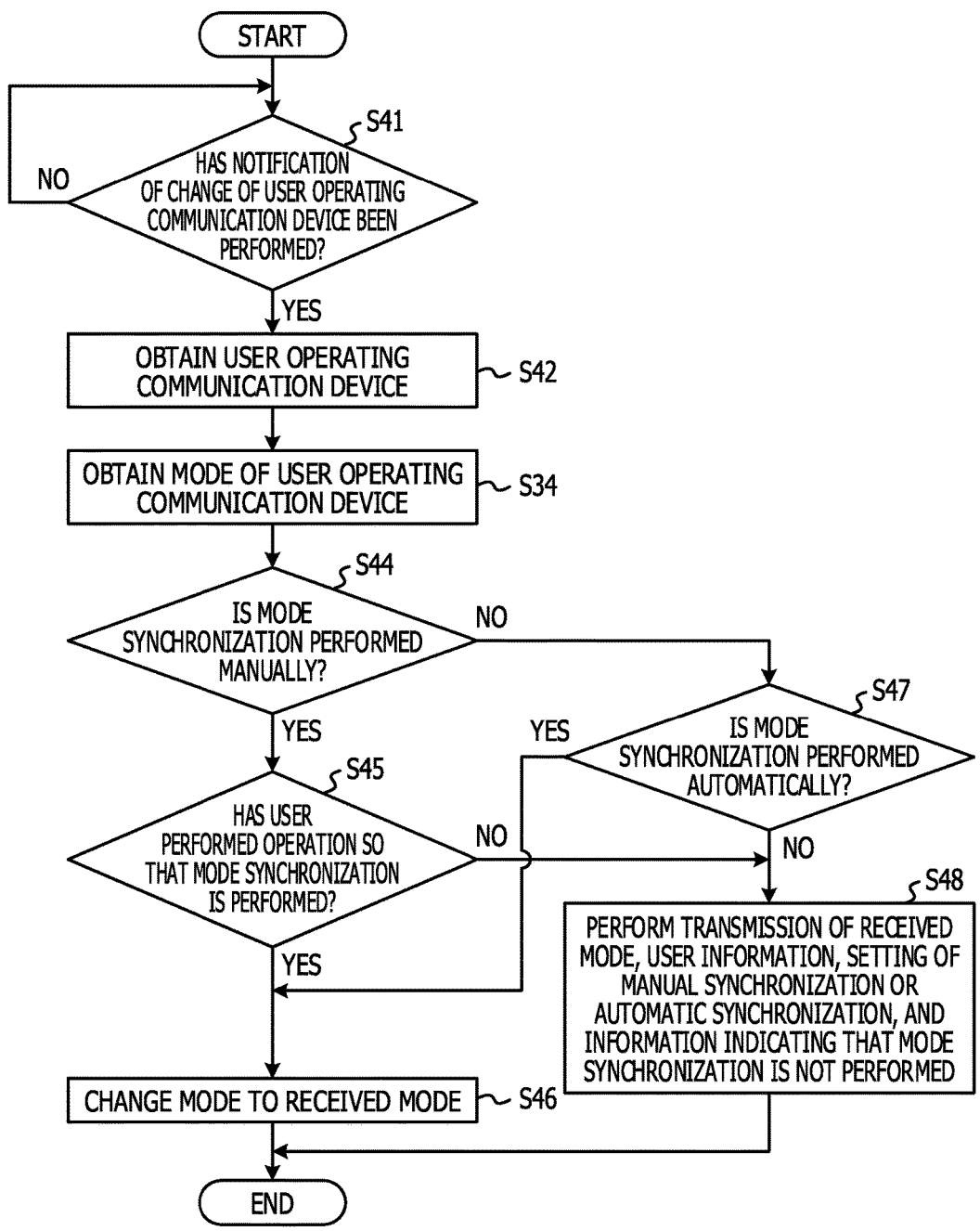
FIG. 13 is a flowchart illustrating an example of mode synchronization processing at the time of user change.

FIG. 13 is a flowchart illustrating an example of the mode synchronization processing at the time of user change. The processing illustrated in the example of FIG. 13 is executed on the communication device 12 side. In the example of FIG. 13, it is determined whether a change of the user who is operating the communication device has been notified from the communication device-to-user correspondence management unit 22 of the management server 11 (S41), and when a change of the user is not notified from the communication device-to-user correspondence management unit 22 (NO in S41), the state becomes the standby state until the change of the user who is operating the communication device is notified from the communication device-to-user correspondence management unit 22. In addition, when the change of the user who is operating the communication device has been notified from the communication device-to-user correspondence management unit 22 (YES in S41), the user who is operating the communication device 12 is obtained from the communication device-to-user correspondence management unit 22 (S42), and the mode of the user who is operating the communication device is obtained from the mode management unit 21 (S43).

After that, the mode synchronization determination unit 34 determines whether the mode synchronization is performed manually (S44), and when the mode synchronization is performed manually (YES in S44), the mode synchronization determination unit 34 determines whether the user has performed the operation so that the mode synchronization is performed (S45). When the user has performed the operation so that the mode synchronization is performed (YES in S45), the mode is changed to the received mode (S46).

In addition, in the processing of S44, when the mode synchronization is not performed manually (NO in S44), it is determined whether the mode synchronization is performed automatically (S47), and when the mode synchronization is performed automatically (YES in S47), the above-described processing of S46 is executed.

In addition, when the user has not performed the operation so that the mode synchronization is performed in the processing of S45 (NO in S45), or when the mode synchronization has not been performed automatically in the processing of S47 (NO in S47), the mode and the user information that have been received from the management server 11, the setting of manual synchronization or automatic synchronization, the information indicating that the mode synchronization has not been performed are transmitted to the management server 11 (S48).

<Mode Switching Example at the Time of User Change>

Figure 14:
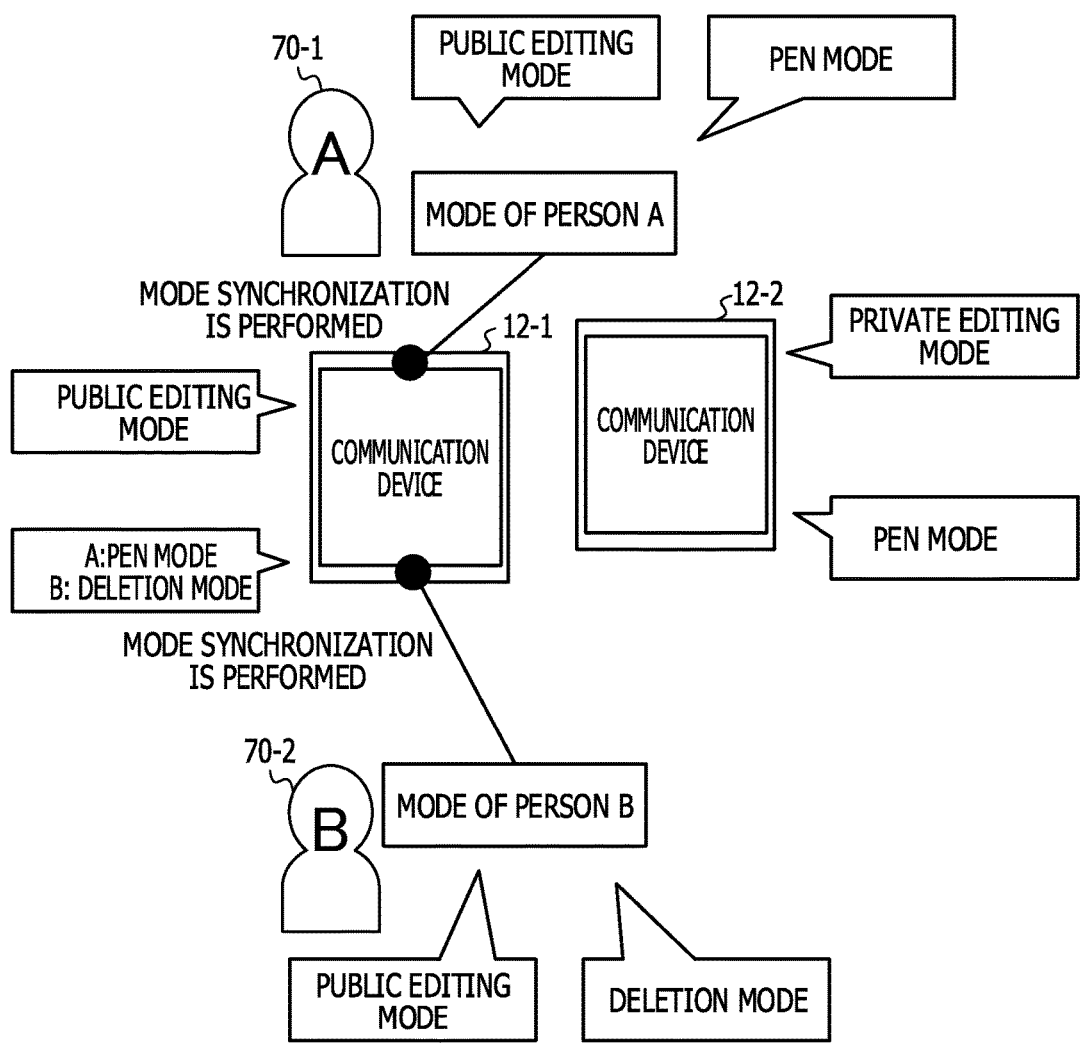
FIG. 14 is a diagram illustrating a mode switching example at the time of user change.

FIG. 14 is a diagram illustrating a mode switching example at the time of user change. In the example of FIG. 14, an example is illustrated in which the user 70-2 (person B) uses the communication device 12-1 when the user 70-1 (person A) uses the communication device 12-1. In this case, the mode management unit 21 of the management server 11 manages the mode for each of the users, and the communication device-to-user correspondence management unit 22 manages the relationship between the user and the communication device, so that mode switching may be performed on the mode of the person A and the mode of the person B separately, for the identical communication device 12-1.

For example, in the example of FIG. 14, when the user 70-1 uses the communication device 12-1, setting of "public editing mode" and "pen mode" is performed. In addition, when the user 70-2 uses the communication device 12-1, setting of "public editing mode" and "deletion mode" is performed. In addition, when the users 70-1 and 70-2 also use the communication device 12-2, the mode synchronization between the communication devices is also performed.

<Example of the Mode Return Processing>

Figure 15:
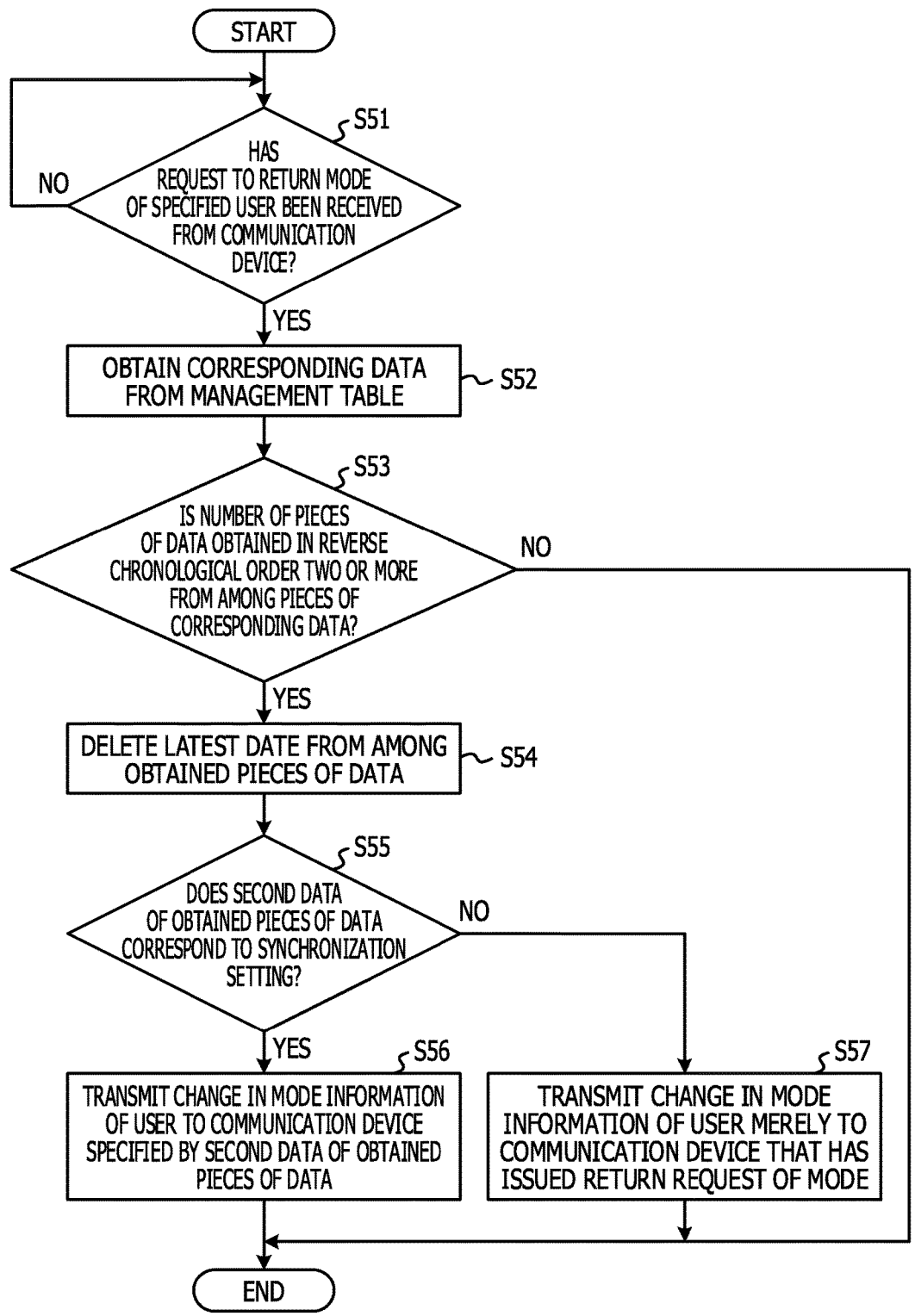
FIG. 15 is a flowchart illustrating an example of mode return processing.

FIG. 15 is a flowchart illustrating an example of the mode return processing. The processing illustrated in the example of FIG. 15 is executed on the management server 11 side. In the example of FIG. 15, the mode management unit 21 determines whether a request to return the mode of the specified user has been received from the communication device 12 (S51), and when the request to return the mode is not received from the communication device 12 (NO in S51), the state becomes the standby state until the request is received from the communication device 12. In addition, when the request to return the mode has been received from the communication device 12 (YES in S51), for example, the mode management unit 21 obtains data (row) having the corresponding "user information", "communication device information", and "attribute", from the above-described management table illustrated in FIG. 8 (S52).

After that, it is determined whether the number of pieces of data (rows) that have been obtained in reverse chronological order is two or more, from among the pieces of corresponding data (row) (S53), when the number of rows is two or more (YES in S53), the latest data (row) from among the obtained rows is deleted (S54).

After that, when it is determined whether the second data corresponds to synchronization setting, from among the obtained pieces of data (S55), and when the second data corresponds to the synchronization setting (YES in S55), the change in the mode information of the user is transmitted to the communication devices 12 that has been specified by the second data from among the obtained pieces of data (S56).

In addition, when the second data does not correspond to the synchronization setting in the processing of S55 (NO in S55), the change in the mode information of the user is transmitted merely to the communication device 12 that has transmitted the request to return the mode (S57). In addition, in the processing of S53, when the number of pieces of obtained data is not two or more (NO in S53), that is, when the number of pieces of data is 1 or 0, the return processing does not have to be performed so that the processing ends as is. When the management table is managed with the history information, the mode may be returned to the previous mode easily due to the above-described processing. In the example of FIG. 15, for example, the user specifies a mode, and the above-described return processing may be executed merely for the specified mode.

Other Embodiments

In the above-described embodiment, the mode synchronization determination is performed on the communication device side, but the embodiment is not limited to such an example. For example, various pieces of information related to the mode synchronization determination are managed on the management server 11 side, and the management server 11 performs the mode synchronization determination, and when it is determined that the mode synchronization is desired, information used to perform the mode synchronization is transmitted to the target communication device 12. The communication device 12 may change the mode when the information used to perform the mode synchronization has been received from the management server 11.

As described above, in the embodiments, the mode synchronization may be optimized. In the embodiments, for example, when the operation is performed so that the modes are synchronized between a plurality of communication devices, the start of the mode synchronization may be presented to the user at appropriate timing. The embodiments may be applied to a user interface technology and the like by which a plurality of users edits images, documents, and the like, and browses materials using a plurality of communication devices.

The technology discussed herein is described above in detail, but is not limited to the specific embodiments, and various modifications and changes may be made within the range described in the claims. In addition, some or all of the above-described embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control system comprising:
   a server including a first processor and a first memory; and
   a plurality of communication devices including a second processor, respectively,
   wherein
   the first memory is configured to store first mode information for each user,
   the first mode information is associated with a mode of an application, the first mode information being selected from among a plurality pieces of mode information of the mode for distinguishing a function executed by same operation from another function for the application,
   the first processor is configured to transmit a respective first mode information of a user to the plurality of communication devices operated by the user, and
   the second processor is configured to:
   receive the first mode information,
   obtain second mode information set to the mode of the application installed to a communication device among the plurality of communication devices,
   record an operation content related to mode information change performed on the communication device, and
   determine whether the second mode information set to the mode of the application is switched to the first mode information, based on the operation content, the first mode information, and the second mode information.

2. A control method executed by a communication device, the control method comprising:
   receiving, from a server, first mode information of a user of the communication device, the first mode information being associated with a mode of an application installed in the communication device and the first mode information being selected from among a plurality pieces of mode information of the mode for distinguishing a function executed by same operation from another function for the application;
   obtaining second mode information set to the mode of the application;
   recording an operation content related to mode information change performed on the communication device; and
   determining whether the second mode information set to the mode of the application is switched to the first mode information, based on the operation content, the first mode information, and the second mode information.

3. The control method according to claim 2, further comprising:
   storing, in a memory, a table in which the first mode information and the second mode information are associated with each other.

4. The control method according to claim 2, further comprising:
   displaying, on a display, a screen used to accept selection of whether switching to the first mode information is performed.

5. The control method according to claim 4, wherein
   the operation content indicates whether the user has previously performed an operation in which the switching is approved.

6. The control method according to claim 2, wherein
   the determining is executed, when the communication device operated by the user is changed or setting of the mode is changed from the first mode information to the second mode information.

7. The control method according to claim 2, further comprising:
   determining whether the first mode information set to the server is changed to the second mode information; and
   transmitting the second mode information associated with the mode of the application to the server when the first mode information is changed to the second mode information.

8. A communication device comprising:
   a memory; and
   a processor coupled to the memory and configured to:
   receive, from a server, first mode information of a user of the communication device, the first mode information being associated with a mode of an application installed in the communication device and the first mode information being selected from among a plurality pieces of mode information for distinguishing a function executed by same operation from another function for the application,
   obtain second mode information set to the mode of the application,
   record an operation content related to mode change performed on the communication device, and
   determine whether the second mode information set to the mode of the application is switched to the first mode information, based on the operation content, the first mode information, and the second mode information.

9. The communication device according to claim 8, wherein
   the processor is configured to store, into the memory, a table in which the first mode information and the second mode information are associated with each other.

10. The communication device according to claim 8, wherein
    the processor is configured to display, on a display, a screen used to accept selection of whether switching to the first mode information is performed.

11. The communication device according to claim 10, wherein
the operation content indicates whether the user has previously performed an operation in which the switching is approved.

12. The communication device according to claim 8, wherein
the processor is configured to determine whether the second mode information set to the mode of the application is switched to the first mode information, when the communication device operated by the user is changed or setting of the mode is changed from the first mode information to the second mode information.

13. The communication device according to claim 8, wherein
the processor is configured to:
determine whether the first mode information set to the server is changed to the second mode information, and
transmit the second mode information associated with the mode of the application to the server when the first mode information is changed to the second mode information.

* * * * *